United States Patent [19]

Grinberg et al.

[11] 4,227,201

[45] Oct. 7, 1980

[54] CCD READOUT STRUCTURE FOR DISPLAY APPLICATIONS

[75] Inventors: Jan Grinberg, Los Angeles; Michael Waldner, Woodland Hills, both of Calif.; Joe A. Jenney, Vienna, Va.

[73] Assignee: Hughes Aircraft Company, Culver City, Calif.

[21] Appl. No.: 5,418

[22] Filed: Jan. 22, 1979

Related U.S. Application Data

[63] Continuation of Ser. No. 796,641, May 13, 1977, abandoned.

[51] Int. Cl.³ .................... H01L 29/78; G11C 19/28; G02F 1/13
[52] U.S. Cl. ................... 357/24; 307/221 D; 350/332; 350/334; 350/342
[58] Field of Search .............. 357/24; 307/221 D; 350/332, 334, 342

[56] References Cited

U.S. PATENT DOCUMENTS

| | | | |
|---|---|---|---|
| 3,719,849 | 3/1973 | Steward | 357/17 |
| 3,792,465 | 2/1974 | Collins et al. | 357/24 |
| 3,796,927 | 3/1974 | Boyle et al. | 357/24 |
| 3,918,070 | 11/1975 | Shannon | 357/24 |
| 3,973,136 | 8/1976 | Lee | 357/24 |
| 4,032,954 | 6/1977 | Grinberg et al. | 350/342 |
| 4,074,302 | 2/1978 | Brewer | 357/24 |
| 4,093,357 | 6/1978 | Jacobson et al. | 350/342 |

OTHER PUBLICATIONS

Grove *Physics and Technology of SemiConductor Devices* Wiley, N.Y. (1967) pp. 191-194.

*Primary Examiner*—Gene M. Munson
*Attorney, Agent, or Firm*—W. H. MacAllister; G. L. Cline; E. N. Kramsky

[57] ABSTRACT

A liquid crystal light valve which uses the transfer of charge carriers representing a plurality of signals from a CCD array to a liquid crystal light modulated display medium. The signal charge is extracted from the back side of the CCD by driving the CCD clock voltages to zero and allowing the charge to diffuse to the back side where it is collected in a charge depleted region formed by a reverse biased diode and injected into the interface layers of a liquid crystal display medium.

11 Claims, 6 Drawing Figures

CCD READOUT STRUCTURE FOR DISPLAY APPLICATIONS

The invention herein claimed was reduced to practice in the course of/or under contract with the Defense Advanced Research Projects Agency of the United States Department of Defense.

This is a continuation of application Ser. No. 796,641 filed May 13, 1977, now abandoned.

FIELD OF THE INVENTION

This invention relates generally to a charge storage and transfer structure and more particularly to an interface structure for the storage and transfer of input data from a CCD array to a liquid crystal light valve.

RELATED APPLICATIONS

In a copending U.S. patent application Ser. No. 005,418 filed on Jan. 22, 1979, which stands allowed entitled, "High Resolution Continuously Substituted Silicon Photodiode Substrate" by Grinberg, et al and assigned to the present assignee, there is disclosed and generically claimed a semiconductor apparatus for the transfer of charge from one surface of a substrate to the opposite through the use of a charge depletion region.

BACKGROUND OF THE INVENTION

U.S. Pat. No. 3,824,002 issued to Terry D. Beard, entitled "Alternating Current Liquid Crystal Light Valve" and assigned to the present assignee discloses the basic principles of operation of an alternating current liquid crystal light valve which requires that a photoconductor be impedance-matched to the liquid crystal, the photocapacitance of the photoconductor being modulated in response to an input light.

U.S. Pat. No. 3,976,361 issued to Fraas, et al entitled "Charge Storage Diode With Graded Defect Density Photocapacitive Layer" and assigned to the present assignee discloses a different photoconductor for a similar light valve.

The photoconductor consists of a charge storage semiconductor diode with a graded band gap layer increasing the optical absorption coefficient of the region near the rectifying junction to permit the storage of charge.

U.S. Pat. No. 4,032,954 issued on June 28, 1977, by Jan Grinberg, et al, entitled "Silicon Single Crystal Charge Storage Diode" and assigned to the present assignee describes a species of the generic invention of U.S. Pat. No. 3,976,361. This invention presently stands allowed and will issue in due course. It discloses a charge storage photodiode silicon substrate which is doped with a slow recombination center element such as silver, to combine the advantages of a highly developed silicon manufacturing technology with the high liquid crystal stability under ac operating conditions. It is submitted that the inventions disclosed and claimed in the aforementioned patents and patent applications represent thereby significant advances in this art as explained in detail in said patents and patent application.

The aforementioned copending U.S. patent application Ser. No. 005,418 discloses the use of a charge depletion region to transfer a plurality of signals from one side of a semiconductor substrate to the opposite with good spatial resolution. As it was indicated in that application, minority carriers representing signals can be generated or injected into the transfer medium through a variety of different means. One such means that was disclosed in that application was the photogeneration of charge carriers inside the transfer medium. The present invention deals primarily with the storage and transfer of minority charge carriers created by different means.

SUMMARY OF THE INVENTION

The general purpose of this invention is to provide interface means for coupling CCD signals to a processing circuit. More specifically, it involves a charge transfer structure that passes the charge stored in CCD registers through the thickness of a silicon substrate and into a liquid crystal.

To accomplish this purpose, we have provided a semiconductor apparatus for the transfer of a plurality of signals in the form of minority carriers from a CCD array on a surface of a semiconductor substrate to an opposite surface through the use of at least one charge depletion region in the semiconductor substrate while maintaining their spatial resolution. This apparatus includes a semiconductor substrate on a surface of which there is an insulating layer and at least one set of electrodes in this insulating layer forming a surface CCD structure on this surface of the substrate. This apparatus further includes some means for establishing a charge depletion region of a predetermined size on another side of this substrate opposite the CCD. With the proper voltage bias on the CCD electrodes, the charge that is stored under these electrodes will diffuse towards the depletion region and will be field guided while it is in the depletion region and it will be injected into a utilization structure.

The utilization structure may be a light modulated display medium such as a liquid crystal layer with its associated interface layers.

The means for creating a depletion region in the substrate may be a reverse biased diode, such as that disclosed in the aforementioned copending U.S. patent application Ser. No. 792,842, filed on May 2, 1977 or a series of reverse biased discrete PN junctions or a Schottky barrier gate diode, or any other scheme that can deplete a semiinsulating substrate of its mobile charge carriers. The use of a high resistivity silicon (or other semiconductor material) makes easier the depletion of the mobile charges from the structure. When the substrate is depleted, it permits the electric field lines within the depleted region to focus the flow of charge from the CCD buckets to the liquid crystal. Thus, the resolution of the image is preserved.

A CCD input register can be used to accept serial input data, store it and reformat it for subsequent parallel processing. Our invention provides a charge transfer structure that passes the charge stored in the CCD registers through the thickness of the silicon substrate and into a liquid crystal or other equivalent light modulated display medium. Such a structure is useful for many wide bandwidth optical data processing applications. For example, an optical data processing liquid crystal light valve structure that accepts the distribution of charge from the CCD and converts it to an equivalent variation of optical birefringence can be used to spatially modulate a laser beam.

One advantage of the present invention is that it can contain means for protecting the CCD array from the light valve readout light.

Another advantage of the present invention is that it provides a smooth surface for alignment of the liquid crystal layer.

Another advantage of the present invention is that it provides an optically flat and reflective surface for the light valve readout light.

Accordingly, it is an object of the present invention to provide an interface circuit for the transfer of charge carriers representing signals from a CCD array to a liquid crystal or any other light modulated display medium.

It is another object of this present invention to provide a structure to read out, in parallel the charge from a CCD array.

It is another object of this invention to provide a structure for transferring signal representing charge carriers to a liquid crystal while maintaining their spatial resolution.

It is yet another object of the present invention to shield the liquid crystal layer from the clock signal.

It is still another object of the present invention to provide a surface that has a negligible electrochemical interaction with the liquid crystal.

These and other objects of the invention will become more fully apparent in the following description of the accompanying drawings.

DETAILED DESCRIPTION OF THE DRAWINGS

Figure 1:
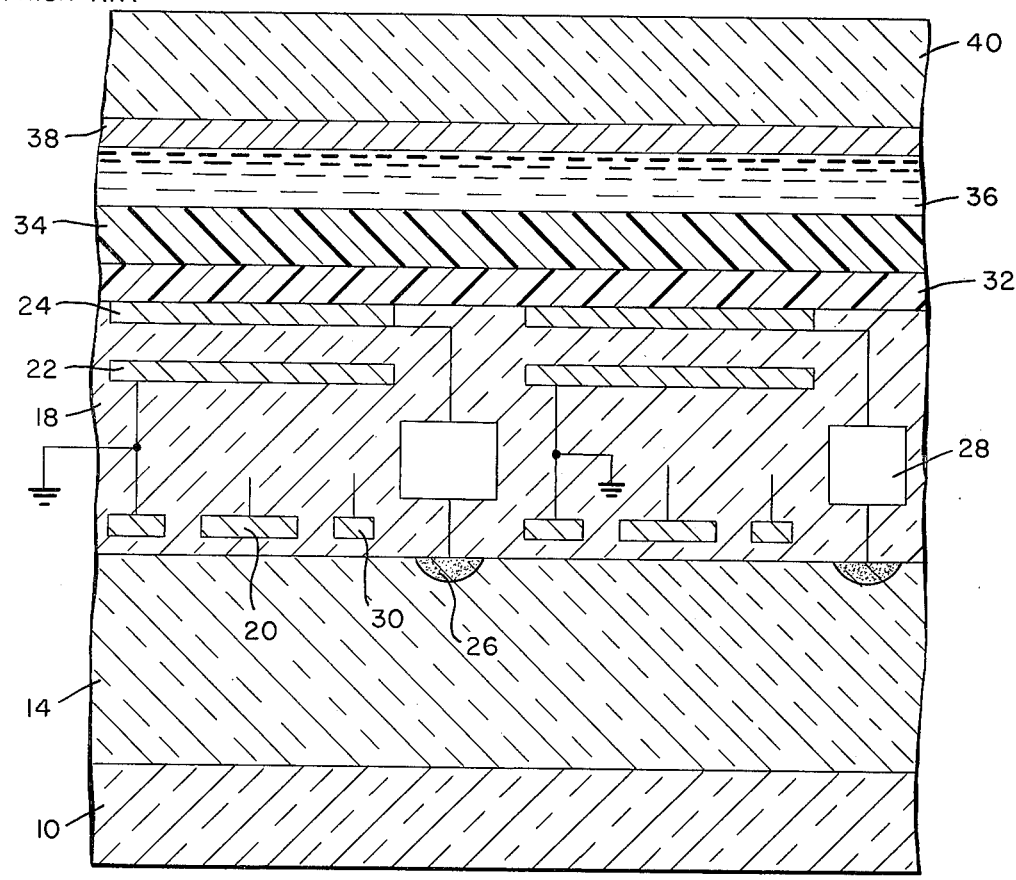
FIG. 1 is a diagrammatic cross-sectional view of a light valve structure employing a prior art readout circuit with the CCD array between the silicon and the liquid crystal layer.

Referring now to FIG. 1, there is shown a cross-sectional view of two adjacent liquid crystal light valves, each one of which include a prior art CCD readout circuit. They both use a glass substrate 10, followed by CCD structures consisting of a silicon body 14 and an insulating layer 18, made of $SiO_2$, which includes a set of CCD electrodes 20 for each readout circuit appropriately biased for the storage and sequential transfer of packets of charge.

In the dielectric layer there is also a grounded shield layer 22 and an output electrode 24 which is connected to a sense diode 26 through an output amplifier 28. A gate signal in electrode 30 transfers the charge from the CCD channel to the depletion layer of the PN junction in the sense diode 26 and then through output amplifier 28 to the output electrode 22. The shield electrode 22 is grounded and is there to protect the output electrode 24 from the clock signal of electrode 30. Next to the output electrode 24 are interface layers 32 and 34 that can be a light blocking layer and a mirror, respectively. These interface layers are followed by the liquid crystal 36, a transparent electrode 38 and a layer of glass 40.

Figure 2:
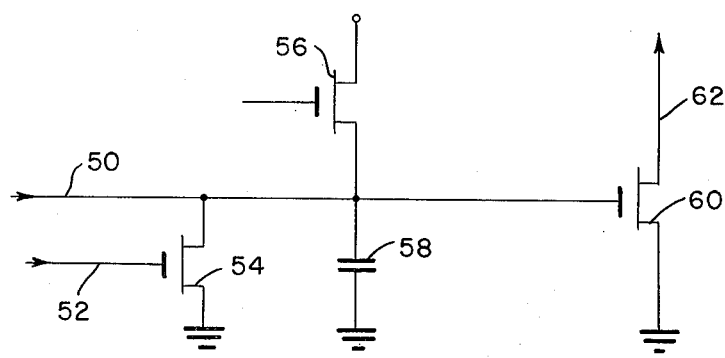
FIG. 2 is an example of an output amplifier for the readout circuit of FIG. 1.

Referring now to FIG. 2, there is shown an example of a readout amplifier that can be used for element 28 of FIG. 1. It includes a switching transistor 54, a load resistor 56, an integrating capacitor 58 and an output driver 60. A gate signal 52 transfers the charge from the CCD bucket to the depletion layer of the sense diode 26 and the output 50 of the diode passes through the amplifier and the output 62 goes to the output electrode 24. With this circuit the device has voltage and current amplification capabilities. However, it would require an output amplifier for every CCD cell. The current pulse to the liquid crystal can be approximately rectangular, and the width can be controlled by the control signal. Furthermore, the polarity of the liquid crystal power supply voltage can be switched periodically and this provides a pseudo ac voltage across the liquid crystal, which improves the liquid crystal stability.

Among the many limitations and disadvantages of structures such as the one of FIG. 1 are device complexity and a large capacitive current flow from the clocks to the shield layer. The device complexity is due to the large number of layers and the need to have an output amplifier per every CCD cell, which means that for an NXN array there is a need for $N^2$ amplifiers. The next major disadvantage is due to the large capacitive current between the clock and shield electrodes a clock signal of 10 V at a frequency of 1 MHz results in a current of 0.3 $A/cm^2$. One way to reduce this current is to significantly increase the thickness of the $SiO_2$ layer. This, however, makes it difficult to make contacts to the output and shield electrodes and, at the same time to maintain the smooth surface required for the liquid crystal alignment.

Figure 3:
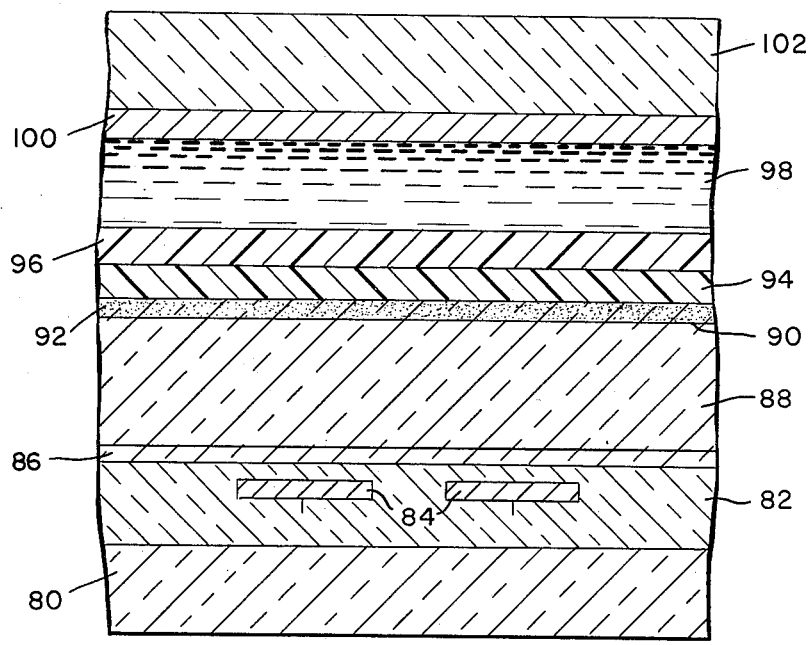
FIG. 3 is a diagrammatic cross-sectional view of a light valve structure constructed in accordance with the present invention.

Referring now to FIG. 3, there is shown a CCD-liquid crystal light valve structure constructed in accordance with the present invention. It includes a glass substrate 80 on which there is an insulating layer 82 such as $SiO_2$ inside which are the CCD electrodes 84 followed by a high resistivity semi-insulating semiconductor substrate, such as silicon 88, with a surface for the CCD channel. Between the semiconductor substrate 88 and the insulating layer 82, there is a thin epitaxial layer 86 of the same conductivity type as that of the substrate. Typically, this layer has a thickness in the range between 5–25 $\mu$m. On the opposite side of the substrate 88 is a PN junction 90 and a layer 92 of opposite conductivity for the other side of the junction. This is followed by two liquid crystal interface layers such as a light blocking layer 94, and a mirror 96. The interface layers are followed by a liquid crystal 98 and a transparent electrode 100 and a glass counter electrode 102. In this arrangement the CCD structure can be inverted and the readout takes place on the opposite side of the semiconductor substrate 88, by driving the clock signals to zero or slightly opposite to the polarity they had prior to the time for the charge transfer. For example, for an n-channel CCD the clock signals will have to be driven to zero or slightly negative. The minority charge carriers stored in the CCD buckets in the epitaxial layer will be allowed to diffuse toward the substrate which is depleted of the minority mobile charge carriers and there the charges will be electric field guided towards the opposite surface of the substrate and the PN junction 90. However, PN junction 90 is reverse biased and, therefore, it collects the minority carriers and injects them into the interface layers towards the liquid crystal. Thus, this structure has two depletion layers, one formed by the CCD electrodes and the other by the reversed biased PN junctions. These two depletion layers are normally separated by an undepleted layer in the epitaxial layer. Therefore, the entire structure operates as a common base transistor. The junction is like the collector junction, the undepleted region is like the base, and the CCD like the emitter that injects charge into the base.

The spatial resolution of the charges in the overall structure is maintained because:

a. In the undepleted region (which is in the epitaxial layer) the lateral field is negligible and charge moves by diffusion. Therefore, the thickness of the undepleted region should be lower than the required resolution (i.e., 5 to 25 μm).

b. In the depleted region, the potential is determined by the space charge and not by the current flow. Therefore, there is no lateral field in this region either. Moreover, the spreading of the charge in this region is much lower, because of field focusing. This effect is expressed by:

$$L = d\,(KT/eV)^{\frac{1}{2}}$$

where L is the charge spreading and d is the layer thickness. Under normal operating conditions $eV \gg KT$, therefore, good resolution can be maintained with relatively thick layers. We would like to make this depletion layer thick in order to be able to make the silicon wafer thick. This is important for convenient handling. For instance, with a dopant level of $10^{14}/cm^3$ and 100 V, a wafer of 5 mils (125 μm) can be used. It is relatively easy to work with a wafer this thick.

The junction can be one of three kinds—(a) discrete diodes (n islands in a p region). The depletion layer will spread between the islands, creating a continuous collecting medium; (b) a continuous PN junction (in which case the depletion region has to spread up to the surface); or a (c) Schottky diode.

Among the advantages of the structure discussed above over those of the prior art (as shown in FIG. 1) are its simplicity and the fact that it does not require shielding the clock electrodes. It also provides a smoother surface for the alignment of the liquid crystal and its associated interface layers. In addition, the surface of the substrate is optically polished to prevent a scattering of light.

The interface layer 94 and 96 can be CERMET light blocking layer and a CERMET mirror like the ones described in great detail in a copending U.S. patent application Ser. No. 784,894 by J. Grinberg, et al, filed on Apr. 5, 1977, entitled "Cermet Interface for Electro-Optical Devices" and assigned to the same assignee as is the present invention. However, other light blocking layers and mirrors may also be used.

Figure 4:
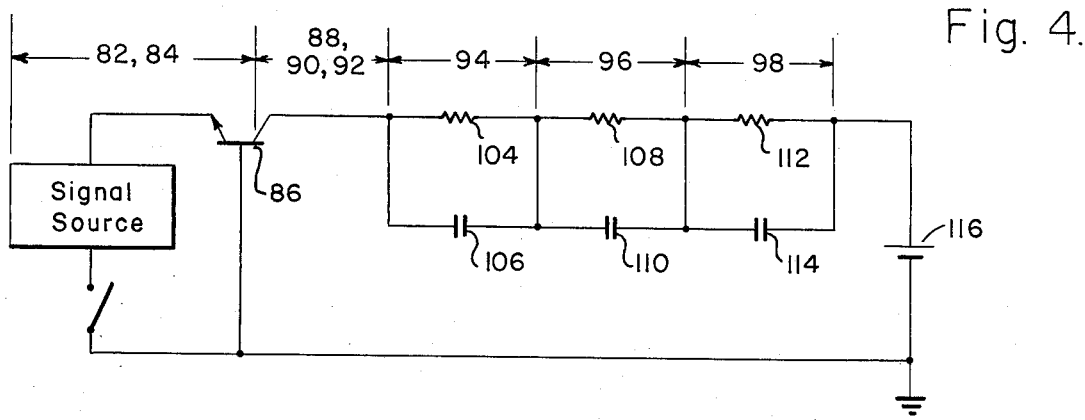
FIG. 4 is an equivalent circuit of the readout structure disclosed and claimed in the present invention.

In FIG. 4, there is shown an equivalent common base transistor circuit for the transfer mechanism for the CCD charge from one side of a silicon wafer to the other. The undepleted, grounded, epitaxial layer 86 is represented as the base of the transistor, and the thick depleted collection junction 88, 90, 92 corresponds to the collection junction in the equivalent circuit. As soon as the CCD clock electrode bias goes to zero the stored minority carriers diffuse through the undepleted epitaxial layer and are collected by the collecting junction, in much the same manner as in the common base transistor. The two interface layers are represented by two RC circuits. For example, the CEMET light blocking layer 94 can be represented by a resistor 104 in parallel with a capacitor 106. Similarly, the CERMET mirror 96 can be represented by resistor 108 in parallel with capacitor 110 and the liquid crystal 98 by resistor 112 in parallel with capacitor 114. By way of illustration, Table 1 provides some typical values for the resistance and capacitance of the different layers represented in the equivalent circuit of FIG. 4.

TABLE 1

|  | Designation | Value |
|---|---|---|
| CERMET light blocking layer | 104 | 30KΩ cm$^2$ |
|  | 106 | 15nP/cm$^2$ |
| CERMET mirror | 108 | 6KΩ cm$^2$ |
|  | 110 | 10nP/cm$^2$ |
| Liquid crystal | 112 | 1.5mΩ cm$^2$ |
|  | 114 | 3NP/cm$^2$ |

Bias voltage 116 may be something in the range of 50 to 100 volts.

The transmission efficiency can reasonably be expected to be very high, in fact, close to unity. The α of a common base transistor can be expressed as:

$$\alpha = \gamma_1 \gamma_2 \gamma_3,$$

where $\gamma_1$ = emitter injection efficiency, the ratio (n/(n+p)), where n and p are the number of electrons and holes, respectively, that cross the emitter junction. In our case $\gamma_1 = 1$. $\gamma_2$ is the recombination factor in the undepleted base region, and it depends on the ratio of the undepleted layer thickness, d, to the minority carrier diffusion length, $L = \sqrt{D\tau}$. Assuming D=36 cm$^2$/sec and $\tau = 10^{-4}$ sec for electrons, L=600 μm, then $\gamma_2 = 1 - d/L = 0.984$ for d=10 μm. $\gamma_3$ is the transmission efficiency in the depleted region and in the usual case it is unity, or slightly above unity, because of field multiplication. Therefore, we expect to have α very close to unity. This means that all charge stored in the CCD capacitances will be transmitted to the liquid crystal layer. The peak voltage gain $T = V_p/V_{clock}$ ($V_p$ = peak voltage across the LC) will be inversely proportional to the capacitance ratio.

$$T = \frac{C_{ox}}{C_{LC}} = \frac{d_{LC}}{d_{ox}} \times \frac{\epsilon_{ox}}{\epsilon_{LC}} \times \frac{A_{ox}}{A_{LC}},$$

where $\epsilon_{ox}$ and $\epsilon_{LC}$ are the dielectric constants of the oxide layer and the LC, respectively, $d_{ox}$ and $d_{LC}$ are the thicknesses of the CCD oxide and the LC layer, and $A_{ox}$ is the relative CCD electrode area that carries the charge that defines the signal.

Using some exemplary values for the thickness of the different layers, the voltage gain becomes:

$$T = (3/0.1) \times (5/10) \times (0.25/1) = 3.75$$

Thus, if $V_{CL} = 10$ V, the available maximum peak voltage across the liquid crystal is 37.5 V.

For a given charge transfer, the liquid crystal response is larger as the LC resistivity is larger. This can be shown by using the LC in the field effect, electro-optic mode of this device. Thus, the response of the LC is proportional to the strength of the field. The signal charge from the CCD will be dumped into the liquid crystal capacitance and then the liquid crystal capacitance will discharge through the liquid crystal resistance. Therefore, the voltage amplitude is determined by the liquid crystal capacitance and the quantity of transferred charge. If the discharge time is less than or equal to the LC electro-optic response time, the response of the LC will be larger as the integral of the voltage pulse is larger or, in other words, as the LC resistivity is larger. The upper value of this resistivity is limited by the requirement that the LC capacitance will discharge between the frame (25 msec). If the resistivity is chosen so that $$\rho_{LC}\epsilon_{LC} < 0.2 \text{ Frame Time} = 5 \text{ msec,}$$

then the residual charge (from the previous frame) will be less than 1%. This determines the upper limit for the LC resistivity (the minimum required charge). If the frame time is assumed to be 25 msec and the LC dielectric constant is assumed to be 10, then $$\rho_{LC\ max} = 5 \cdot 10^9 \ \Omega\text{-cm}$$

Figure 5:
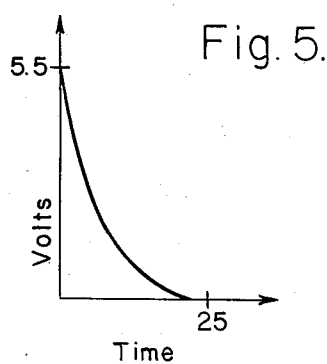
FIG. 5 is a graph of the voltage peak across the liquid crystal of an embodiment of the present invention.
Figure 6:
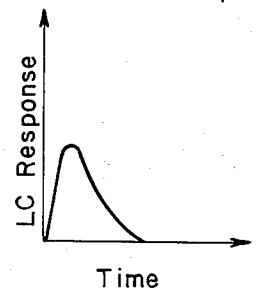
FIG. 6 is the liquid crystal response to the voltage of FIG. 5.

Assuming that a liquid crystal under steady state conditions has a threshold voltage of 1 V and a full response voltage of 2 V, the turn-on time is about 10 msec, which corresponds to a time constant of approximately 5 msec. Combining the two effects—the liquid crystal capacitance discharge (the liquid crystal voltage decay) and the liquid crystal response (the rotation of the liquid crystal molecules)—results in a requirement of 5.5 V voltage amplitude across liquid crystal for full response. In FIG. 5, there is shown the required voltage across the liquid crystal. In FIG. 6, there is shown the liquid crystal response to the voltage of FIG. 5.

This is considerably less than the maximum available voltage of 37.5 V. Therefore, there is a considerable safety factor in the voltage available to drive the liquid crystal to full response. This shows that the CCD circuit will easily drive the liquid crystal for an electro-optic effect. In fact, the safety factor is large enough that it could be used in a trade-off to improve more marginal performance parameters of the device.

The main purpose of the epitaxial layer (86) of FIG. 3 is to shield the CCD circuitry from the readout structure and to separate the two. However, it is not an indispensable layer for the operation of the structure. The CCD structure may be constructed directly over a surface of the high resistivity substrate in which case when the charge is released from the CCD buckets, by collapsing the CCD clocks they will be electric fields guided towards the other end of the substrate and the liquid crystal.

What is claimed is:

1. A liquid crystal light valve activated by a charge-coupled device (CCD) comprising:
   (a) a semiconductor substrate characterized by first and second major opposite surfaces;
   (b) a CCD arrangement formed on said first major substrate surface and including a set of CCD electrodes for storage and transfer of charge carriers in charge depletion buckets adjacent to said set of CCD electrodes;
   (c) a liquid crystal layer adjacent to said second major substrate surface;
   (d) means for establishing within said substrate an electric field substantially below avalanche breakdown wherein the value of said field is selected to form a depletion region and an undepleted region between said first and second major substrate surfaces, said undepleted region separating said charge depletion buckets from said depletion regions; and
   (e) means for biasing said CCD electrodes so that said charge carriers are transferred from adjacent to said CCD electrodes through said undepleted region to said depletion region where they are then electric-field guided without avalanching through said depletion region to said second major substrate surface without substantial lateral spreading in order to activate said liquid crystal layer.

2. A liquid crystal light valve activated by a charge-coupled device (CCD) comprising:
   (a) a semiconductor substrate characterized by first and second major opposite surfaces;
   (b) a CCD structure formed adjacent to said first major substrate surface including a set of CCD electrodes and an insulating layer adjacent to said first surface for the insulation of said set of CCD electrodes;
   (c) a semiconductor interface layer between said insulating layer and said first major substrate surface for storage and transfer of said charge carriers in charge depletion buckets adjacent to said CCD electrodes;
   (d) a liquid crystal layer adjacent to said second major substrate surface; and
   (e) means for establishing an electric field substantially below avalanche breakdown in said substrate transverse to said major surfaces wherein the value of said field is selected to form a charge depletion region which extends between said major surfaces of said substrate and an undepleted region within said semiconductor interface layer, said undepleted region separating said charge depletion buckets from said depletion region within said substrate so that, when proper bias conditions are applied on said CCD electrodes, said charge carriers adjacent to said CCD electrodes diffuse through said interface layer to said charge depletion region where they are then electric-field guided without avalanching through said substrate without substantial lateral spreading in order to activate said liquid crystal layer.

3. A device as set forth in claim 2 wherein said means for establishing said electric field within said substrate is a reverse biased continuous PN junction formed in a portion of said substrate.

4. A device as set forth in claim 2 wherein said rectifying means for establishing said electric field within said substrate comprises a series of discrete and reverse biased PN junctions.

5. A device as set forth in claim 2 wherein said means for establishing said electric field within said substrate is a reverse biased Schottky barrier gate diode structure formed on said second major surface of said substrate.

6. A device as set forth in claim 2 wherein interface layers are between said liquid crystal layer and said semiconductor substrate for preventing light from entering said substrate through said major substrate surface adjacent said liquid crystal layer and for reflecting said light.

7. A liquid crystal light valve activated by a charge-coupled device (CCD) comprising:
   (a) a semiconductor substrate characterized by first and second major opposite surfaces;
   (b) a CCD structure formed adjacent to said first major substrate surface including a set of CCD electrodes and an insulating layer adjacent to said first surface for the insulation of said set of CCD electrodes;
   (c) a semiconductor interface layer between said insulating layer and said first major substrate surface for storage and transfer of said charge carriers in charge depletion buckets adjacent to said CCD electrodes;

(d) a liquid crystal layer adjacent to said second major substrate surface;

(e) a rectifying junction formed in a portion of said substrate;

(f) means for reverse-biasing said junction to establish an electric field substantially below avalanche breakdown wherein the value of said field, the thicknesses of said semiconductor interface layer and said semiconductor substrate, and the resistivities of said semiconductor interfere layer and said semiconductor substrate are selected to form a depletion region between said first and second major substrate surfaces and an undepleted region within said semiconductor interface layer, said undepleted region separating said charge depletion buckets adjacent to said CCD electrodes from said depletion region within said substrate; and (g) means for biasing said CCD electrodes so that said charge carriers diffuse from said interface layer through said undepleted region to said substrate depletion region where they are then electric-field guided without avalanching through said depletion region to said second major substrate surface without substantial lateral spreading in order to activate said liquid crystal layer.

8. A device as set forth in claim 7 wherein said interface layer is an epitaxial layer formed on said first surface of said substrate.

9. A device as set forth in claim 8 wherein:
(a) said semiconductor substrate is silicon;
(b) said epitaxial layer is silicon;
(c) said insulating layer is silicon dioxide; and
(d) said rectifying junction is a PN junction.

10. A device as set forth in claim 7 wherein said substrate has a resistivity greater than 1000 ohm-centimeter.

11. A device as set forth in claim 7 wherein said interface layer has a thickness less than one-sixth the thickness of said substrate and said interface layer has a resistivity less than the resistivity of said substrate.

* * * * *